United States Patent
Yang et al.

(10) Patent No.: US 9,897,844 B2
(45) Date of Patent: Feb. 20, 2018

(54) COLOR FILTER SUBSTRATE AND A LIQUID CRYSTAL PANEL

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Falu Yang, Beijing (CN); Lei Dai, Beijing (CN); Jun Hwan Lim, Beijing (CN); Junrui Zhang, Beijing (CN)

(73) Assignees: BOE TECHNOLOGY GROUP CO., LTD. (CN); CHENGDU BOE OPTOELECTRONICS TECHNOLOGY CO., LTD. (CN)

( * ) Notice: Subject to any disclaimer, the term of this patent is extended or adjusted under 35 U.S.C. 154(b) by 69 days.

(21) Appl. No.: 14/144,943

(22) Filed: Dec. 31, 2013

(65) Prior Publication Data
US 2014/0204320 A1    Jul. 24, 2014

(30) Foreign Application Priority Data
Jan. 18, 2013  (CN) .......................... 2013 1 0019769

(51) Int. Cl.
*G02F 1/1335*    (2006.01)
*G02F 1/1337*    (2006.01)
(Continued)

(52) U.S. Cl.
CPC ....... *G02F 1/133509* (2013.01); *G02B 5/201* (2013.01); *G02B 5/208* (2013.01);
(Continued)

(58) Field of Classification Search
None
See application file for complete search history.

(56) References Cited

U.S. PATENT DOCUMENTS 5,776,604 A * 7/1998 Lu ........................... B41M 1/30
                                                      427/412.3
6,649,952 B2 * 11/2003 Sawada ........................ 257/294
(Continued)

FOREIGN PATENT DOCUMENTS

CN        101320108        12/2008
CN        101493610         7/2009
WO    WO 2011152404 A1 * 12/2011  ........... C09D 5/1637

OTHER PUBLICATIONS

English translation of WO 2011152404 A1, which is US 2013/0078460, Title: Paint, Adhesive Composition, Bonding Method and Laminate, Author: Tasaka; Michihisa and Kanno; Hiroyasu; Date of publication: Aug. 12, 2011.*
(Continued)

*Primary Examiner* — Edward Glick
*Assistant Examiner* — Shan Liu
(74) *Attorney, Agent, or Firm* — Brooks Kushman P.C.

(57) ABSTRACT

The present invention provides a color filter substrate and a liquid crystal panel. The color filter substrate according to an embodiment of the present invention comprises a base substrate, a color filter layer and an optical layer which is provided on the color filter layer and comprises an ultraviolet absorption material. The ultraviolet absorption material in the color filter substrate or the liquid crystal panel according to the present invention can absorb ultraviolet and prevent the color resin in the color filter layer from being damaged by ultraviolet transmitting through the optical layer.

8 Claims, 5 Drawing Sheets

(51) Int. Cl.
*G02B 5/22* (2006.01)
*G02B 5/20* (2006.01)

(52) U.S. Cl.
CPC ....... *G02B 5/223* (2013.01); *G02F 1/133514* (2013.01); *G02F 1/133723* (2013.01); *G02F 2201/086* (2013.01)

(56) References Cited

U.S. PATENT DOCUMENTS

| | | | |
|---|---|---|---|
| 7,608,312 B1* | 10/2009 | Edlein et al. | 428/35.7 |
| 8,149,357 B2* | 4/2012 | Choi et al. | 349/104 |
| 2003/0020843 A1* | 1/2003 | Onishi | G02F 1/13334 349/32 |
| 2005/0140908 A1* | 6/2005 | Song | G02F 1/134309 349/146 |
| 2005/0163943 A1* | 7/2005 | Uchiyama | B32B 27/08 428/1.31 |
| 2005/0274455 A1* | 12/2005 | Extrand | C09J 5/00 156/272.4 |
| 2005/0276761 A1* | 12/2005 | Gupta | A61K 8/26 424/59 |
| 2006/0065900 A1 | 3/2006 | Hsieh et al. | |
| 2010/0033657 A1* | 2/2010 | Choi | G02F 1/13378 349/104 |
| 2010/0213423 A1* | 8/2010 | Shiau | C09K 19/56 252/589 |
| 2011/0019134 A1* | 1/2011 | Lee et al. | 349/106 |
| 2012/0074434 A1* | 3/2012 | Park | H01L 33/486 257/88 |
| 2012/0136098 A1* | 5/2012 | Amasaki | C07D 251/24 524/100 |
| 2012/0258263 A1* | 10/2012 | Tamura | G02B 1/04 428/1.33 |
| 2012/0262639 A1* | 10/2012 | Kim | G02B 27/2214 349/15 |
| 2013/0078460 A1* | 3/2013 | Tasaka | C09D 5/1637 428/339 |
| 2013/0164543 A1* | 6/2013 | Shibuya | G06F 1/1643 428/428 |
| 2014/0334026 A1* | 11/2014 | Gross | G02B 5/23 359/887 |
| 2016/0002097 A1* | 1/2016 | Schmidt | C03C 17/007 428/328 |

OTHER PUBLICATIONS

P.R. China, First Office Action, App. No. 201310019769.3, dated Dec. 1, 2014.
P.R. China, Second Office Action, App. No. 201310019769.3, dated May 25, 2015.

* cited by examiner

COLOR FILTER SUBSTRATE AND A LIQUID CRYSTAL PANEL

CROSS REFERENCE OF RELATED APPLICATIONS

The present application claims priority to and incorporates by reference the entire contents of Chinese priority document 201310019769.3, entitled with "A Color Filter Substrate and A Liquid Crystal Panel" and filed in China on Jan. 18, 2013.

FIELD OF THE INVENTION

The present invention relates to the technical field of displays, and in particular to a color filter substrate and a liquid crystal panel.

DESCRIPTION OF THE PRIOR ART

Liquid Crystal Display (LCD) takes the leading position in the current technical field of flat-panel displays due to its advantages such as small volume, low power consumption, no-radiation and high resolution, and Thin Film Transistor Liquid Crystal Display (TFT-LCD) is the mainstream technology of the liquid crystal display. A TFT-LCD is formed by laminating an array substrate and a color filter substrate, wherein on the array substrate, gate lines and data lines that intersect with each other and define pixel regions are formed, and a pixel electrode and a thin film transistor are formed on each pixel region; and on the color filter substrate, a black matrix and a color filter are formed. The liquid crystal between the array substrate and the color filter substrate generates different rotations under the action of different intensities of an electric field, thereby attaining different display brightness, and a color image display effect may be obtained under the coordination of the color filter layer in the color filter substrate.

As shown in FIG. 1, a color filter substrate comprises a base substrate 1, a black matrix 2, a color filter layer 3, a transparent overcoat 4 and an alignment layer 5, and moreover, the transparent overcoat 4 may be provided with pillar spacers.

Liquid crystal molecules in the liquid crystal display device are initially aligned in a predefined direction by an alignment process, and in the homeotropic alignment liquid crystal display, it's necessary for liquid crystal molecules to get a pre-tilt angle by the alignment process. The alignment technology widely used at present is a rubbing alignment process and a photo alignment process. The rubbing alignment is to achieve aligning of liquid crystal molecules by applying a pressure on the alignment layer of liquid crystal with a roller, and the rubbing alignment has the following disadvantages: (1) Due to a rubbing mode by contacting with a rubbing cloth, electrostatic and particle containments are produced to damage the elements of liquid crystal displays. Specifically, dusts produced during the rubbing process have a significant effect on the display quality of a display device, and the produced static electricity also disturbs the electrical performances of a display device. (2) The fiber will shed from the rubbing cloth during the rubbing process, which will cause alignment defects. (3) In the industry of the rubbing alignment, washing should be carried out after the rubbing process, thereby increasing steps and cost of the rubbing alignment; and (4) Rubbing alignment technology is usually only applicable to an alignment layer in the shape of a flat plane, while it's very difficult to induce aligning in the alignment layer of a device with a curved surface or a flexible device.

Other alignment technologies other than the rubbing alignment are gained more and more attention in order to avoid the above disadvantages existed in the rubbing alignment. Photo alignment technology is a process where a laser or linear polarized ultraviolet is used to irradiate, and initiate photo-polymerization, photo-induced isomerization or light decomposition of polymeric alignment layer in the substrate so as to generate surface anisotropy, thereby induce liquid crystal molecules to align. Thus the photo alignment technology can overcome the above disadvantages of the rubbing alignment.

However, the photo alignment technology also has some disadvantages. For example, when high-intensitive ultraviolet irradiates on the color filter substrate, the ultraviolet can not only make the polymer in the alignment layer have a capability of aligning, but also transmit through the polymer and irradiate on the color filter layer, and the color and optical property of the color resin in the color filter layer will change when the colorful resin is irradiated by high-intensitive light, which will affect the optical and color performance of the color filter substrate and further affect the image quality of liquid crystal panel.

SUMMARY OF THE INVENTION

The technical problem to be solved in the present invention is to provide a color filter substrate and a liquid crystal panel, which can solve the above disadvantages that the high-intensitive ultraviolet will damage the colorful resin in the color filter layer of the color filter substrate during the photo alignment.

In order to solve the above problems, one embodiment of the present invention provides a color filter substrate, comprising a base substrate and a color filter layer, and optical layer comprising an ultraviolet absorption material is provided on the color filter layer.

Further, in the color filter substrate, the optical layer comprises a transparent overcoat of the color filter substrate, and the transparent overcoat comprises the ultraviolet absorption material.

Further, in the color filter substrate, the optical layer comprises an alignment layer of the color filter substrate, and the alignment layer comprises the ultraviolet absorption material.

Further, in the color filter substrate, the optical layer comprises an ultraviolet absorption material layer which is made of the ultraviolet absorption material and located between the transparent overcoat and the alignment layer in the color filter substrate.

Further, in the color filter substrate, the optical layer comprises an ultraviolet absorption material layer which is made of the ultraviolet absorption material and located between the color filter layer and the transparent overcoat in the color filter substrate.

Further, in the color filter substrate, the ultraviolet absorption material is deposited on the side of the alignment layer that is close to the base substrate.

Further, in the color filter substrate, the ultraviolet absorption material include one or more selected from the group consisting of esters of salicylic acid, benzophenones, benzotriazoles, substituted acrylonitrile, triazines, titanium dioxide and zinc oxide.

Further, in the color filter substrate, the composition used to form the transparent overcoat comprises a reactive monomer, a prepolymer, an additive and an ultraviolet absorption material.

Further, in the color filter substrate, the composition used to form the alignment layer comprises polyimide and an ultraviolet absorption material.

Further, in the color filter substrate, the ultraviolet absorption material is present in an amount of from about 0.5% to about 25% by mass in the optical layer.

Another embodiment of the present invention provides a liquid crystal panel, which comprises any one of the color filter substrate as described above.

The color filter substrate and the liquid crystal panel according to the present invention have the following advantageous effect: the ultraviolet absorption material in the color filter substrate or the liquid crystal panel can absorb ultraviolet and prevent the colorful resin in the color filter layer from being damaged by ultraviolet transmitting through the optical layer.

| Reference Label | |
|---|---|
| Base Substrate | 1 |
| Black matrix | 2 |
| Color filter layer | 3 |
| Transparent overcoat | 4 |
| Alignment layer | 5 |
| Ultraviolet Absorption Materials Layer | 6 |
| Polarized Ultraviolet | 7 |

DETAILED DESCRIPTION OF THE PREFERRED EMBODIMENTS

In order to make the technical problems to be solved, the technical solutions and the advantages of the embodiments of the invention more apparent, a detailed description will be given below in conjunction with the drawings and the specific embodiments.

In order to improve photo alignment technology, one embodiment of the present invention provides a color filter substrate comprising a base substrate and a color filter layer, wherein an optical layer comprising an ultraviolet absorption material is provided on the color filter layer.

The ultraviolet absorption material in the color filter substrate according to the embodiment of the present invention can absorb ultraviolet to prevent a red, green and blue color resin in the color filter layer from being damaged by ultraviolet transmitting through the optical layer.

Figure 1:
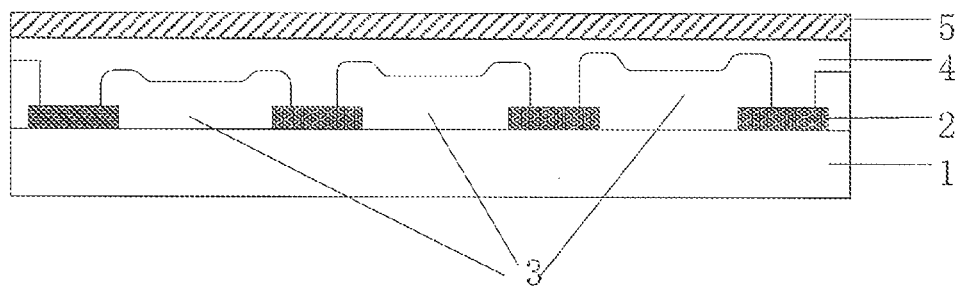
FIG. 1 is a structural representation of a color filter substrate in the prior art.
Figure 2:
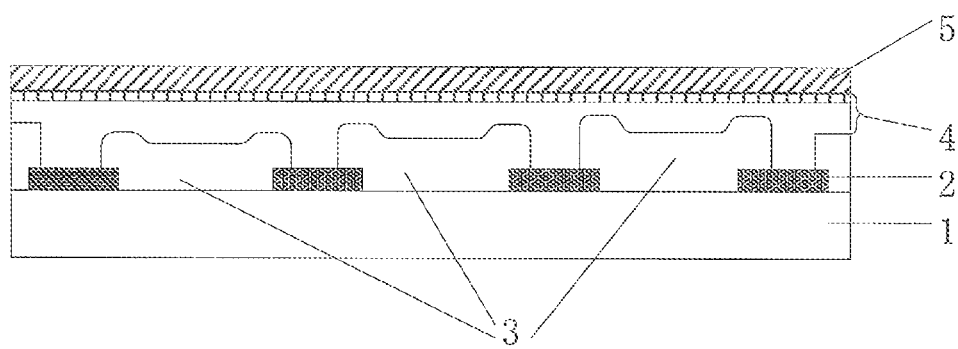
FIG. 2 is a structural representation of a color filter substrate where an ultraviolet absorption material is deposited on the upper part of the transparent overcoat.
Figure 3:
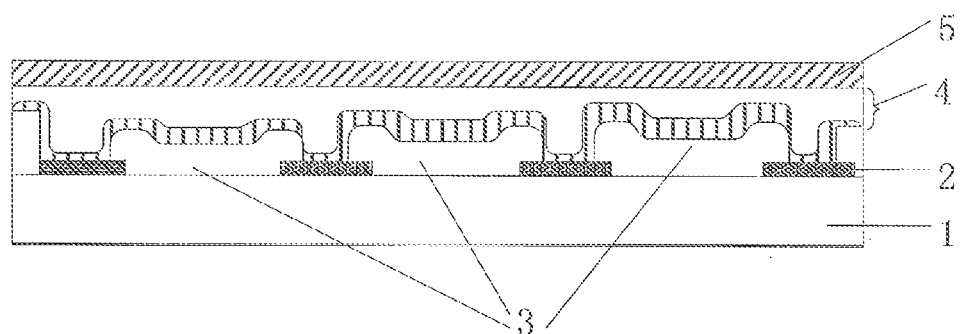
FIG. 3 is a structural representation of a color filter substrate where an ultraviolet absorption material is deposited on the under part of the transparent overcoat.
Figure 4:
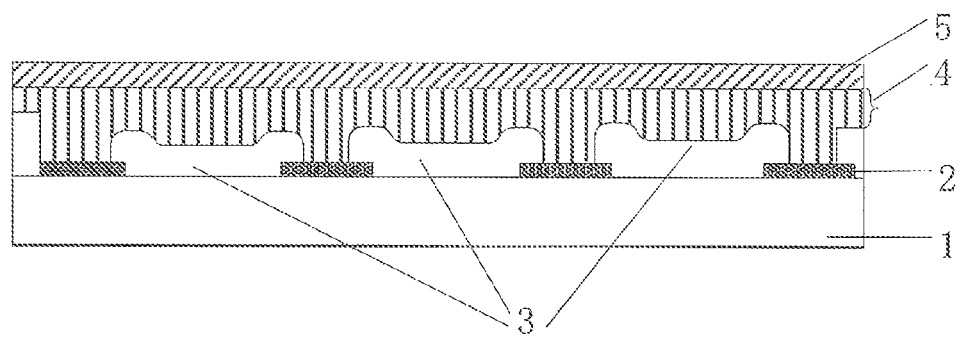
FIG. 4 is a structural representation of a color filter substrate where an ultraviolet absorption material is dispersed in the transparent overcoat.

In a preferable embodiment, as shown in FIGS. 2 to 4, the optical layer comprises a transparent overcoat 4 of the color filter substrate, wherein the transparent overcoat 4 comprises the ultraviolet absorption material.

In a preferable embodiment, the composition used to form the transparent overcoat 4 comprises a reactive monomer, a prepolymer, an additive and an ultraviolet absorption material. As shown in FIGS. 2 to 4, the optical layer is particularly preferably transparent overcoat 4, and the composition used to form the transparent overcoat 4 comprises an adhesive, a reactive monomer, an additive, a solvent and an ultraviolet absorption material. The liquid composition which is used to form the transparent overcoat 4 and comprises an ultraviolet absorption material is mixed uniformly, then coated onto the color filter layer 3, and the transparent overcoat 4 is formed after the composition is solidified.

Preferably, the ultraviolet absorption material is present in an amount of from about 0.5% to about 25% by mass in the final solids of the transparent overcoat. When the composition is solidified, the ultraviolet absorption material is deposited on the upper part or the under part of the transparent overcoat 4, or dispersed in the transparent overcoat 4 depending on the density of the ultraviolet absorption material. The specific situations are described in detail as follows:

As shown in FIG. 2, the ultraviolet absorption material will be deposited on the upper part of the transparent overcoat 4 after the composition is solidified if the density of the ultraviolet absorption material is lower than that of other components in the transparent overcoat 4.

As shown in FIG. 3, the ultraviolet absorption material will be deposited on the under part of the transparent overcoat 4 after the composition is solidified if then density of the ultraviolet absorption material is higher than that of other components in the transparent overcoat 4.

As shown in FIG. 4, the ultraviolet absorption material will be dispersed in the transparent overcoat 4 after the composition is solidified if the density of the ultraviolet absorption material is the same as that of other components in the transparent overcoat 4.

In one embodiment of the present invention, a black matrix 2 is formed on the base substrate, a red, green and blue color filter layers 3 through which a red, green and blue light can transmit respectively are formed in sequence, then a solution which is used to form the transparent overcoat 4 and comprises an ultraviolet absorption material is coated onto the color filter layer 3, and a transparent overcoat 4 is formed after the solution is solidified. The specific steps of the above process includes:

Forming a black matrix by coating materials onto the base substrate 1, pre-solidifying, exposing, developing and solidifying; and Forming a red, green, blue color filter layers 3 in order, which comprises coating a red resin, pre-solidifying, exposing, developing and solidifying thereof; coating a green resin, pre-solidifying, exposing, developing and solidifying thereof; coating a blue resin, pre-solidifying, exposing, developing and solidifying thereof; and forming a color filter layer 3 after the red resin, the green resin and the blue resin are cured.

In the above embodiment, black matrix 2 and color filter layer 3 can also be formed by other processes such as a heat transfer process.

A solution, which is used to form the transparent overcoat 4 and comprises an ultraviolet absorption material, is coated onto the color filter layer 3, and the transparent overcoat 4 is formed after the solution is solidified. In this process, if the mass of the solution which is used to form the transparent overcoat 4 is assumed to be 100 parts by mass, the mass of solids in the final transparent overcoat may decrease to 20 parts by mass because other components in the solution mostly have evaporated after being coated and solidified. In the final solids, the mass of the ultraviolet absorption material should be in the range of from about 0.1 to 5 parts by mass, and in the final transparent overcoat, the amount of the ultraviolet absorption material should be in the range of from about 0.5% to 25% by mass.

As shown in FIGS. 2 to 4, after being solidified, the ultraviolet absorption materials may be deposited on the upper part or under part of the transparent overcoat 4, or dispersed in the transparent overcoat 4.

An alignment layer 5 is formed on the transparent overcoat 4.

Figure 5:
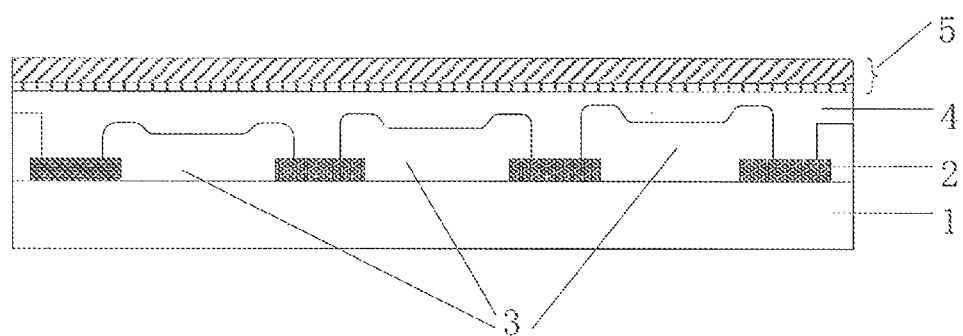
FIG. 5 is a structural representation of a color filter substrate where an ultraviolet absorption material is deposited on the side of the alignment layer that is close to the base substrate.

In a preferable embodiment, as shown in FIG. 5, the optical layer comprises an alignment layer 5 of the color filter substrate, and the alignment layer 5 comprises the ultraviolet absorption material.

In a preferable embodiment, the composition used to form the alignment layer 5 comprises polyimide resin and an ultraviolet absorption material.

Preferably, the ultraviolet absorption material is present in an amount of from about 0.5% to about 25% by mass in the solids of the final alignment layer. In this process, if the mass of the solution which is used to form the alignment layer 4 is assumed to be 100 parts by mass, the mass of solids in the final alignment layer may decrease to 20 parts by mass because other components in the solution mostly have evaporated. In the final solids, the mass of the ultraviolet absorption material should be in the range of from about 0.1 to 5 parts by mass, and its percentage is in the range of from about 0.5% to 25% by mass.

In a preferable embodiment, as shown in FIG. 5, the ultraviolet absorption material is deposited on the alignment layer 5 that is close to the base substrate 1.

Figure 6:
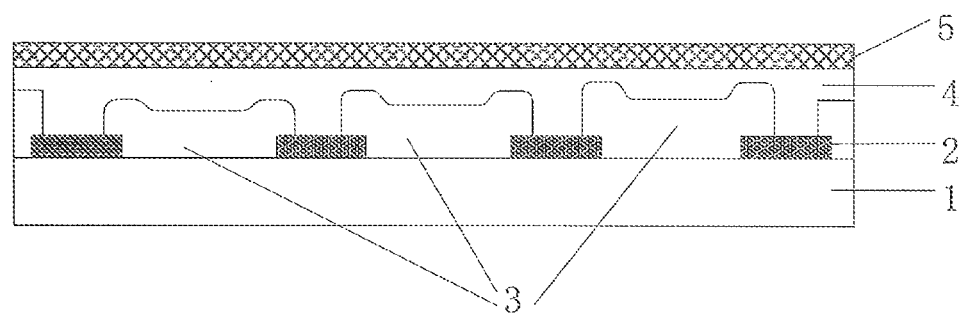
FIG. 6 is a structural representation of a color filter substrate where an ultraviolet absorption material is dispersed in the alignment layer.

In a preferable embodiment, as shown in FIG. 6, the ultraviolet absorption material in the color filter substrate is dispersed in the alignment layer 5.

Preferably, the optical layer particularly is an alignment layer 5, the main components of the alignment agent used to form the alignment layer comprises polyimide, N-methyl pyrrolidone (NMP), butyl cellosolve (BC), and γ-butyrolactone (γ-BL).

An ultraviolet absorption material is added to the existing alignment agent. Preferably, the ultraviolet absorption material is present in an amount of from about 0.5% to 25% in the solids of the final alignment layer. The ultraviolet absorption material is deposited on the under part of the alignment layer 5 or dispersed in the alignment layer 5 depending on the density of the ultraviolet absorption material. When polarized ultraviolet 7 irradiates on the surface of the alignment layer 5, the ultraviolet absorption material can absorb ultraviolet and does not react with other components in the alignment layer 5, which prevents color filter layer 3 from being damaged by polarized ultraviolet 7 transmitting through the alignment layer 5 and the transparent overcoat 4.

Figure 7:
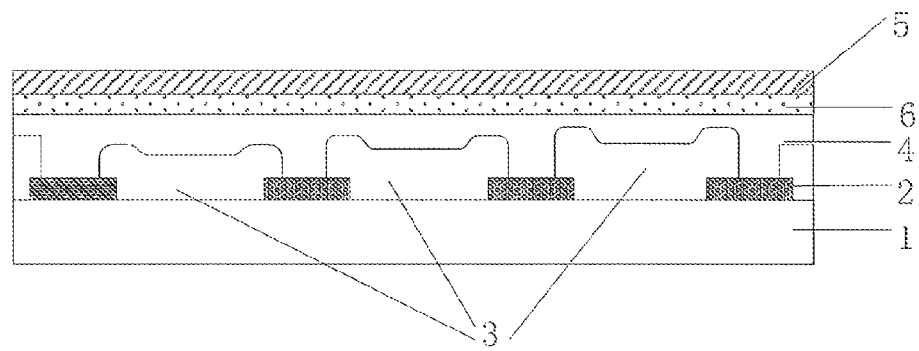
FIG. 7 is a structural representation of a color filter substrate where an ultraviolet absorption material layer is located between the transparent overcoat and the alignment layer.

In a preferable embodiment, as shown in FIG. 7, the optical layer comprises an ultraviolet absorption material layer 6 which is made of the ultraviolet absorption material and located between the transparent overcoat 4 and the alignment layer 5 of the color filter substrate.

Figure 8:
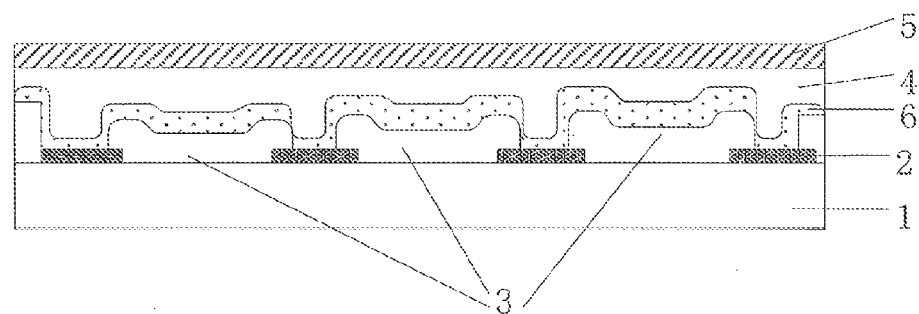
FIG. 8 is a structural representation of a color filter substrate where an ultraviolet absorption material layer is located between the color filter layer and the transparent overcoat.

In a preferable embodiment, as shown in FIG. 8, the optical layer comprises an ultraviolet absorption material layer 6 which is made of the ultraviolet absorption material and located between the color filter layer 3 and the transparent overcoat 4 of the color filter substrate.

The optical layer may be the transparent overcoat 4 comprising an ultraviolet absorption material, and also be the alignment layer 5 comprising an ultraviolet absorption material. In other words, the optical layer may be a separate layer, i.e. the ultraviolet absorption material layer 6, and the transparent overcoat 4 or the alignment layer 5 itself. The optical layer may also refer to multiple layers which comprise the transparent overcoat 4, alignment layer 5 or ultraviolet absorption material layer 6, wherein, both the transparent overcoat 4 and the alignment layer 5 comprises an ultraviolet absorption material.

In a preferable embodiment, the ultraviolet absorption material comprises one or more selected from the group consisting of esters of salicylic acid, benzophenones, benzotriazoles, substituted acrylonitrile, triazines, titanium dioxide and zinc oxide.

In a preferable embodiment, the optical layer particularly is alignment layer 5. The steps for forming the color filter substrate comprises:

Forming black matrix 2 as a light shielded layer on the base substrate 1;

Forming a red, green, blue color filter layers 3 in sequence;

Providing a smooth transparent overcoat 4 on the color filter layer 3; and

Coating alignment agent which is used to form alignment layer 5, the main components of the alignment agent comprises polyimide, N-methyl pyrrolidone (NMP), butyl cellosolve (BC), γ-butyrolactone (γ-BL);

Adding and ultraviolet absorption material into the existing alignment agent.

Figure 9:
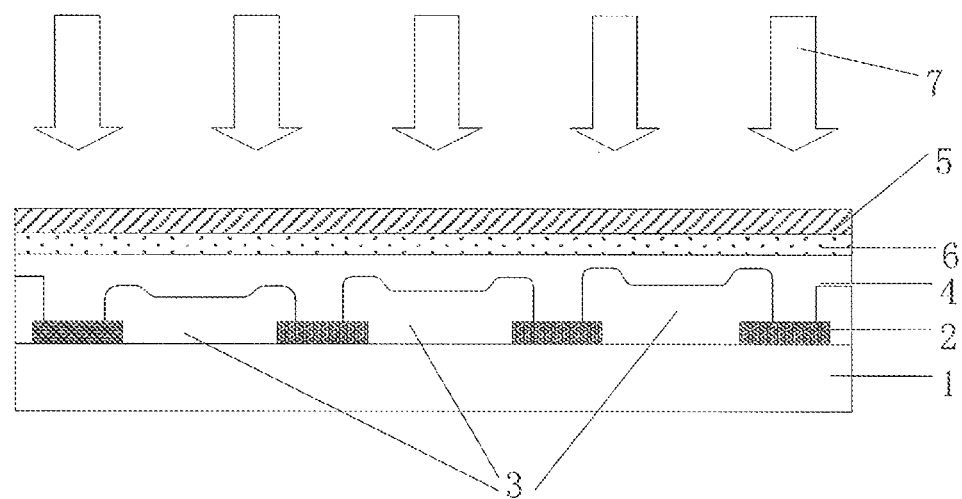
FIG. 9 is a representation of the photo alignment technology.

Preferably, the ultraviolet absorption material is present in an amount of from about 0.5% to about 25% in the alignment layer 5. As shown in FIG. 9, the ultraviolet absorption material absorbs polarized ultraviolet 7 to protect the color filter substrate when polarized ultraviolet 7 irradiates on the color filter substrate.

An embodiment of the present invention provides a liquid crystal panel comprising the color filter substrate, wherein the color filter substrate comprises a base substrate 1 and a color filter layer 3, and also comprises an optical layer which comprises an ultraviolet absorption material and is provided on the color filter layer 3.

The ultraviolet absorption material in the color filter layer according to the embodiment of the present invention can absorb ultraviolet to prevent red, green, blue resins from being damaged by ultraviolet transmitting through the optical layer.

The embodiments of the present invention have the following advantages: the optical layer is transparent overcoat 4 comprising an ultraviolet absorption material, the optical layer is alignment layer 5 comprising an ultraviolet absorption material, or the optical layer is ultraviolet absorption material layer 6 which is made of an ultraviolet absorption material. In other words, the optical layer may be a separate layer, i.e., transparent overcoat 4 or alignment layer 5 itself; the optical layer may also refer to multiple layers comprising an ultraviolet absorption material. When polarized ultraviolet 7 irradiates on the color filter substrate and generates surface anisotropy in the alignment layer of the color filter substrate, thereby induce liquid crystal molecules to align, the ultraviolet absorption material absorbs polarized ultraviolet 7 so as to protect the color filter substrate from being damaged.

The above description only shows some preferred embodiments of the invention, and it should be appreciated that for one of ordinary skills in the art, many improvements and modifications can be made without departing from the principle of the invention, and all these improvements and modifications fall into the protection scope of the invention.

What is claimed is:

1. A color filter substrate, comprising a base substrate, a black matrix and a color filter layer, wherein an optical layer comprising an ultraviolet absorption material is provided on the color filter layer;
    wherein the optical layer comprises a transparent overcoat of the color filter substrate, and the transparent overcoat is formed of a composition comprising the ultraviolet absorption material, the ultraviolet absorption material is present in an amount of from about 0.5% to about 25% by mass in the transparent overcoat;
    wherein a density of the ultraviolet absorption material is higher than that of other components in the transparent overcoat and the ultraviolet absorption material is deposited on an under part of the transparent overcoat after the composition is solidified, the under part is provided directly on and in physical contact with the color filter layer and the black matrix; an interface between the under part formed by the ultraviolet absorption material and an upper part of the transparent overcoat is uneven and conformally mapped with an uneven contour of the color filter layer and the black matrix; and
    wherein the ultraviolet absorption material is one or more materials selected from a group consisting of esters of salicylic acid and substituted acrylonitrile.

2. The color filter substrate according to claim 1, wherein the composition used to form the transparent overcoat comprises a reactive monomer, a prepolymer, an additive and an ultraviolet absorption material.

3. The color filter substrate according to claim 1, wherein a composition used to form an alignment layer comprises polyimide and an ultraviolet absorption material.

4. The color filter substrate according to claim 1, wherein the optical layer further comprises an alignment layer of the color filter substrate, and the alignment layer comprises the ultraviolet absorption material.

5. A liquid crystal panel, wherein the liquid crystal panel comprises the color filter substrate according to claim 1.

6. The liquid crystal panel according to claim 5, wherein the composition used to form the transparent overcoat comprises a reactive monomer, a prepolymer, an additive and an ultraviolet absorption material.

7. The liquid crystal panel according to claim 5, wherein a composition used to form an alignment layer comprises polyimide and an ultraviolet absorption material.

8. The liquid crystal panel according to claim 5, wherein the optical layer comprises an alignment layer of the color filter substrate, and the alignment layer comprises the ultraviolet absorption material.

\* \* \* \* \*